3,317,604
2,5-DIALKOXY-α-TERTIARY AMINO PROPIOPHENONES AND SALTS THEREOF

Richard Baltzly, Scarsdale, and Nariman B. Mehta, Valhalla, N.Y., assignors to Burroughs Wellcome & Co. (U.S.A.) Inc., Tuckahoe, N.Y., a corporation of New York
No Drawing. Filed Mar. 16, 1966, Ser. No. 534,637
8 Claims. (Cl. 260—570.5)

This invention relates to novel intermediary compounds and chemotherapeutic agents and more particularly to a novel family of ketoamines and compositions thereof.

This application is a continuation in part of copending United States patent application Serial No. 381,881 entitled, "Chemotherapeutic Agents and Method," filed in the names of Richard Baltzly and Nariman B. Mehta, on July 10, 1964.

The novel ketoamines of this invention may be represented by the general Formula I

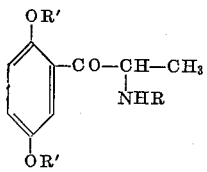

where R is a tertiary alkyl group having 4 to 8 carbon atoms, R' is selected from the class consisting of methyl, ethyl, and propyl, and the three groups R, R' and R' together contain a sum total from 6 to 10 carbon atoms inclusive.

These compounds are disclosed in the above-mentioned copending application, as having utility as intermediaries in the preparation of 2-alkanols, novel chemotherapeutic agents for use in blocking cardiac arrhythmias and blocking the effects of typical adrenergic drugs such as "catecholamines" Methamphetamine, etc. For example, the above referred-to copending application discloses the formation of an alkanol DL-erythro-1-(2,5-dimethoxyphenyl)-2-(t-butylamino)propanol by the hydrogenation of 2,5-dimethoxy-α-t-butylaminopropiophenone, a novel ketoamine of this invention.

It has now also been found that the ketones of Formula I have interesting pharmacological properties, including the ability to lower plasma free-fatty acids and to block the cold-induced rise of plasma free-fatty acids in dogs and rats.

The ketoamines of Formula I may be prepared by the reaction between the amine of the tertiary alkyl group, $RNH_2$, and a haloketone of Formula II

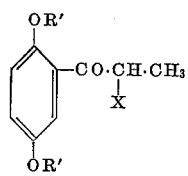

wherein R' is hereinbefore defined and X is a halogen radical, preferably the bromo radical. This reaction is most conveniently carried out at room temperature in acetonitrile as solvent. Also, other solvents such as dimethyl sulfoxide, dimethyl formamide or nitromethane, may be used. Other solvents such as ether, ethanol, may also be used but the reaction proceeds faster in a more polar solvent. At least two equivalents of the tertiary amine should preferably be used since the acid released in the reaction binds the stronger base present. Larger excesses are convenient when the starting amine is inexpensive. The aminoketones are relatively stable compounds and if handled carefully do not tend to break down into tarry materials as do aminoketones having less bulky groups on the nitrogen. It is preferable, however, to convert the bases to acid addition salts and, if desired, to convert one salt to another by any standard procedure.

For most purposes salts of hydrochloric acid are satisfactory and preferred, but other pharmaceutically acceptable acids may be used. Thus phosphates, citrates, malates or lactates are satisfactory (all the corresponding acids being normal constituents of bodily fluids are incapable of producing damage after administration). In certain cases, it may be preferred to present a compound of this series as a salt of one of these other acids.

For use in the treatment of certain diabetic or hyperlipidaemic conditions, ketoamines of Formula I may be presented in a pharmaceutical composition containing a compound, preferably in the form of a salt, together with a pharmaceutically acceptable carrier and it may be made by admixing the compound with the carrier. Preferably a ketoamine is presented in the form of a tablet made by compression of free-flowing granules containing the active ingredient and carriers acting as a diluent and as a lubricant.

This invention therefore provides:

(a) A ketoamine of Formula I and acid addition salts thereof;

(b) A pharmaceutical composition, containing a ketoamine of Formula I, preferably as an acid addition salt thereof, together with a pharmaceutically acceptable carrier therefor;

(c) A method for the preparation of a ketoamine of Formula I and an acid addition salt thereof, and of a composition containing a said ketoamine, substantially as hereinbefore described.

The following are examples of the invention:

EXAMPLE 1

*2,5-dimethoxy-α-t-butylaminopropiophenone*

2,5-dimethoxy-α-bromopropiophenone (2 moles; 548 g.) was dissolved in acetonitrile (500 cc.) and t-butylamine (5 moles; 365 g.) added. The solution was allowed to stand at room temperature for 64 hours and was then diluted with anhydrous ether (2 l.). The precipitated t-butylamine hydrobromide was filtered off and washed with ether. The filtrate and washings were concentrated in vacuo using a water-bath kept at 40° C. When most of the solvent had been removed, the residual material was dissolved in cold methanol and acidified with hydrochloric acid. The solution was then evaporated to dryness in vacuo on the steam bath. The residual mass was extracted twice with ether which was discarded. A portion of the residue was recrystallized from ethanol ether mixture giving a solid that melted at 175–6° C.

EXAMPLE 2

A mixture of finely-powdered 2,5-dimethoxyphenyl-α-t-butylaminopropiophenone and excipient was granulated and compressed into scored tablets each containing 50 mg. of the active ingredient.

EXAMPLE 3

By the method of Example 1, α-bromo-2,5-diethoxy propiophenone was reacted in acetonitrile with an excess of t-butylamine to give α-t-butylamino-2,5-diethoxy propiophenone whose hydrochloride melts at 194–196° C.

EXAMPLE 4

By the method of Example 1, α-bromo-2,5-dimethoxypropiophenone was reacted with t-amylamine giving α-t-amylamino-2,5-dimethoxypropiophenone. This base forms a hydrochloride that crystallizes as a hemihydrate and then melts at 157–159° C. (with effervescense).

EXAMPLE 5

By the method of Example 1, α-bromo-2,5-dimethoxy-propiophenone was reacted with α-amino-2,4,4-trimethyl pentane to give 2,5-dimethoxy-α-(1,1-3,3-tetramethyl butyl) amino propiophenone whose hydrochloride melts at 175–176° C.

EXAMPLE 6

By the method of Example 1, α-bromo-2,5-dipropoxy-propiophenone was reacted with excess t-butylamine to form α-t-butylamino-2,5-dipropoxypropiophenone whose hydrochloride melts at 203–204° C.

What is claimed is:

1. A compound selected from the class consisting of a free base and its salts with pharmaceutically acceptable acids, said free base being represented by the formula:

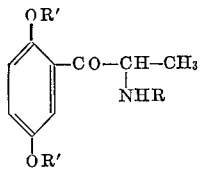

wherein R is a t. alkyl group and R' is selected from the class consisting of methyl and ethyl and propyl and the three groups R, R' and R' together contain from 6 to 10 carbon atoms inclusive.

2. 2,5-dimethoxy-α-t-butylamino propiophenone.
3. A pharmaceutically acceptable salt of 2,5-dimethoxy-α-t-butylamino propiophenone.
4. 2,5-dimethoxy-α-t-butylamino propiophenone hydrochloride.
5. 2,5-diethoxy-α-t-butylamino propiophenone.
6. 2,5-dimethoxy-α-t-amylamino propiophenone.
7. 2,5-dimethoxy-α-(1,1-3,3 - tetramethyl butyl)amino propiophenone.
8. 2,5-dipropoxy-α-t-butylamino propiophenone.

References Cited by the Examiner

Corrigan et al., "Journal American Chemical Society," vol. 75, pages 6258–60 (1953).

CHARLES B. PARKER, *Primary Examiner.*

JOSEPH P. BRUST, *Examiner.*

ROBERT V. HINES, *Assistant Examiner.*